United States Patent [19]

Meinz

[11] Patent Number: 5,065,903

[45] Date of Patent: Nov. 19, 1991

[54] FLUID DELIVERY SYSTEM FOR CONTROLLING FLUID FLOW

[76] Inventor: Hans W. Meinz, Kockerellstrasse 19, 5100 Aachen, Fed. Rep. of Germany

[21] Appl. No.: 639,749

[22] Filed: Jan. 14, 1991

Related U.S. Application Data

[63] Continuation of Ser. No. 362,447, May 30, 1989, abandoned.

[30] Foreign Application Priority Data

Dec. 1, 1986 [DE] Fed. Rep. of Germany ....... 3640980

[51] Int. Cl.$^5$ .............................................. B67D 5/16
[52] U.S. Cl. ....................................... 222/71; 222/59; 91/499; 73/244
[58] Field of Search ....................... 222/59, 71; 91/499; 73/244

[56] References Cited

U.S. PATENT DOCUMENTS

| | | | |
|---|---|---|---|
| 575,991 | 1/1897 | Schonheyder | 91/499 X |
| 1,438,847 | 12/1922 | Miller | 222/59 X |
| 1,985,400 | 12/1934 | Blum | 73/244 |
| 2,040,390 | 5/1936 | Loe | 91/499 X |
| 2,625,914 | 1/1953 | Pressler | 73/244 X |
| 3,308,664 | 3/1967 | Kullmann | 73/258 X |
| 3,772,917 | 11/1973 | Lutz et al. | 73/258 X |
| 4,132,483 | 1/1979 | Slaats et al. | 366/162 |
| 4,211,148 | 7/1980 | Boss | 91/499 |

*Primary Examiner*—Michael S. Huppert
*Assistant Examiner*—Gregory L. Huson
*Attorney, Agent, or Firm*—David C. Purdue; John C. Purdue

[57] ABSTRACT

A delivery system for controlling the flow of fluid is disclosed. The comprises a control valve comprising an electric control motor and a valve, and a hydraulic piston type motor including a shaft which is rotated when fluid flows through the system. The rate at which fluid flows into the system is measured by the hydraulic motor and is reflected by the rate at which the hydraulic motor shaft rotates. The rate at which fluid flows through the system is controlled by the control valve. The control valve is movable between a first position in which a first fluid flow rate through the system is achieved and a second position is which a second flow rate higher than the first rate is achieved. The control motor is responsive to an external signal which indicates a rate rotation for the control motor corresponding with a rate of fluid flow. The control motor shaft, the hydraulic motor shaft and the control valve are dynamically connected so that, when the rate at which fluid id flowing through the system is less than the given rate, the control valve is moved towards the second position and, when the rate at which fluid is flowing through the system is greater than the given rate, the control valve is moved towards the first position. A fluid component dosing apparatus including at least one hydraulically actuated dosing pump driven by a delivery system according to the invention is also disclosed.

10 Claims, 3 Drawing Sheets

FLUID DELIVERY SYSTEM FOR CONTROLLING FLUID FLOW

This application is a continuation of U.S. Ser. No. 07/362,447 field on May 30, 1989 which is now abandoned.

DESCRIPTION

The invention relates to a flowmeter for measuring volumetric flow with a hydraulic motor being designed as a stroke displacement engine which does not produce any external mechanical output and the output pressure of which, corresponding to its hydro-mechanical losses, is slightly lower than the input pressure with the hydraulic motor having a rotating motor shaft being designed as a measuring shaft.

It is known that conventional axial or radial piston motors are used for metering the flow throughput of a volumetric flow. The disadvantage of these hydraulic motors is a relatively high rate of leakage current (2% to 6% in relation to the total absorption current). The higher value is reached with a low rate of rotation and high pressures, the lower value with a high rate of rotation and low pressures. For many applications, such as for example the determination of the actual value in electro-hydraulic amplifiers or the regulation of the through-flow amounts in fluid multi-component systems, in particular polyurethane systems, a leakage current rate of this magnitude, which correspondingly impairs the accuracy of measurement, is unacceptable.

Flowmeters of this type are known from the printed publications DE-C-926 574, DE-B-1 295 217 and FR-A-1 089 325.

In addition, gear wheel motors are known which do not produce any external mechanical output. However, it is not easily possible to fit this type of flowmeter with the measuring shaft leading outwards, since the gear wheel coupled to the measuring shaft would be required to accommodate a large axial force, which would increase the hydro-mechanical losses and reduce both the measuring accuracy and the service life of the device.

From EP 0 003 563 a leakage-current-free hydraulic motor is known which is used for the determination of the actual value in an electro-hydraulic amplifier. However, this hydraulic motor is a linear motor, so that it is only suitable for limited volume throughputs. With this device, a continuous volume flow rate is therefore not possible in principle.

The object of the present invention consists in designing a flowmeter for the measurement of a volumetric flow in such a manner that it can also be employed within an electro-hydraulic amplifier and that it allows continuous as well as exact measurement of the through-flow (accuracy of measurement $<0.1\%$), whereby the disadvantages of the known relevent flowmeters are avoided.

This object is solved in accordance with the invention by a flowmeter of the kind described at the beginning in that the hydraulic motor is designed as a stroke displacement machine, in that the drive unit chamber of the hydraulic motor is constantly connected to its outlet and in that the hydraulic motor has a rotating motor shaft which is designed as a measuring shaft.

The known stroke displacement motors have the lowest leakage losses in comparison with all other designs as a result of the efficient sealing of the cylindrical fits. In the case of sliding valve-controlled hydraulic motors, the leakage losses are comprised of an inner and an outer leakage current. The outer leakage current contains all portions of the pressure fluid which penetrate into the drive unit chamber (=leakage oil chamber) from the pressure side (=inlet) and from the return side (=outlet). These are e.g. the amounts of fluid between the piston and the cylinder which enter the leakage oil chamber of the motor from the hydrostatic pressure area or from the control unit. Since the leakage oil pressure is usually only slightly higher than the atmospheric pressure, the pressure gradient of the outer leakage current is very large, even when the hydraulic motor does not produce any external mechanical output. In contrast, the inner leakage losses are short-circuit losses at the control, which are directed immediately into the return flow pipe without producing any work.

If a conventional stroke displacement motor is used as a flowmeter, the output pressure, corresponding to the hydro-mechanical losses of the motor, is only slightly below the input pressure. In this way the inner leakage losses are also rendered insignificantly small. However, the outer leakage currents, which enter the leakage oil chamber of the motor between piston and cylinder as well as from the control unit, cannot be ignored.

In the case of the flowmeter in accordance with the invention, the outer leakage losses can also be reduced to a harmless level similar to that of the aforementioned inner leakages, if the leakage oil chamber (=drive unit chamber) is connected to the motor outlet so that the pressure gradient of the outer leakage current is also within the range of the hydro-mechanical losses of the motor. The leakage losses resulting from this arrangement are similarly insignificantly small. Further technical advantages of the invention are an excellent reproducible measuring precision (measuring error $<0.1\%$), a very large measuring range (approx. 1:1000) as well as a very large pressure range (up to around 1000 bar). As a result of the extremely small pressure differences between inlet and outlet of the hydraulic motor, the strain on all parts of the drive is extremely low, which is advantageous for the is also within the range of the hydro-mechanical losses of the motor. The leakage losses resulting from this arrangement are similarly insignificantly small. Further technical advantages of the invention are an excellent reproducible measuring precision (measuring error $<0.1\%$), a very large measuring range (approx. 1:1000) as well as a very large pressure range (up to around 1000 bar). As a result of the extremely small pressure differences between inlet and outlet of the hydraulic motor, the strain on all parts of the drive is extremely low, which is advantageous for the service life (little friction) in particular in the case of high pressures and speeds. Apart from the technical advantages, the flowmeter in accordance with the invention has the great advantage that conventional motors produced in series need only be modified in order to accommodate it. The essential component parts can be taken from series production, so that an economic manufacture of the flowmeter in accordance with the invention is possible.

In accordance with a further suggestion the flowmeter according to the invention can be designed in such a way that the outlet of the hydraulic motor through the drive unit chamber is lead outward. This embodiment especially with high pressures and high volumetric flows is advantageous in order to perfectly carry away by means of fluid flowing through the amount of heat resulting from the loss of torque and heating the amount of fluid contained in the drive unit chamber.

In accordance with a further suggestion, the flowmeter in accordance with the invention can be designed in such a way that the hydraulic motor is an axial or radial piston motor.

Axial or radial piston motors allow particularly compact designs, whereby the most widely known embodiments are slide valve-controlled machines. The slide valve control is either installed in the rotating cylinder block (axial piston motor) or is performed with rotary slide valves or eccentrically driven longitudinal sliding valves (radial piston motor). The radial piston motor allows for a large number of pistons arranged in a star-shaped manner around the crankshaft, which makes possible a very small current pulsation (0.1% with a 21 piston motor). Since in addition to this most radial piston motors are in any case designed with thick-walled, pressure-resistant casings, this structure is particularly appropriate for the flowmeter in accordance with the invention. As a result of the extremely small mass inertia moments, these motors are also appropriate for control-specific applications.

Depending on the medium to be measured, the pressure, the temperature and the desired output signal, transmission of the measurement of the angle of rotation can be performed either without a packing via a permanent magnet coupling, or by means of a Hall-effect sensor. If direct coupling of the measuring shaft to a mechanical measuring transducer is desired, it is expedient to seal the measuring shaft with a slide ring seal, which seals in a practically leak-free manner even under high pressures and slide speeds. The axial forces thus produced can be absorbed by crankshaft bearings of suitable dimensions.

In accordance with a further suggestion, the flowmeter in accordance with the invention can be designed in such a way that the hydraulic motor is part of an electro-hydraulic amplifier, whereby the measuring shaft of the hydraulic motor is mechanically coupled to a known copying control valve which is connected to an electric control motor, and that the hydraulic motor carries out the continual measurement of the actual value of a volumetric flow to be measured and regulated by the electro-hydraulic amplifier.

The electro-hydraulic amplifier, which consists of the flowmeter in accordance with the invention, a known copying control valve and a control motor, performs the task of measuring and regulating a pre-specifiable volumetric flow. The control motor is set to a pre-selectable rotating movement (=target value) which, with the aid of the copying control valve, which corrects any non-synchronous movement between the control system and the flowmeter by means of a control sliding valve which reduces the volumetric flow, is reproduced in a rotating output movement of the flowmeter (=actual value) in a manner true to the angle of rotation and whereby the absorption current of the hydraulic motor (=measured volumetric flow) is in direct relation to the rotating movement caused by the hydraulic motor. Thus, the flowmeter is not only responsible for the continual measurement of the actual value, but also for the dynamic correction of the hydromechanical control loop integrated in the copying control valve, in that in the case of a discrepancy between target value and actual value the measuring shaft adjusts the actual value to match the target value via a spindle-nut connection by means of mechanical adjustment of the control sliding valve located in the copying control valve. In contrast to electric actual value pickups, measuring of the actual value, the actual/target value comparison and the adjustment to match the target value occur simultaneously, so that the control oscillation usual with electric control loops which leads to momentary excessive or insufficient loading of the volumetric flow in the case of pressure or load fluctuations in the system does not occur.

In accordance with a further proposal of the invention, the flowmeter can be designed in such a way that the casings of the hydraulic motor and the copying control valve are connected with one another in a sealed manner and that the drive unit chamber of the hydraulic motor is connected with the leakage oil chamber of the copying control valve for the purpose of reducing leakage.

In accordance with a further proposal of the invention, the flowmeter can be designed in such a way that the casings of the copying control valve and the control motor are connected with one another in a sealed manner and that the inner chamber of the control motor is connected to the drive unit chamber of the hydraulic motor.

In contrast to known devices, the embodiments in accordance with the two previous proposals do not make use of the usual packing for the measuring shaft or, if appropriate depending on the nature of the control motor, the packing for the control motor shaft. Because of the low pressure differences between inflow and outflow, inner leakage is in this case negligible, since the leakage oil chambers of the hydraulic motor and the copying control valve have an almost equal fluid pressure. If the inner chamber of the control motor is also connected with the drive unit chamber of the hydraulic motor, the above applies by analogy.

In accordance with a further proposal of the invention, the flowmeter can be used in an electro-hydraulic amplifier for the measurement and regulation of a pre-specifiable volumetric flow used to drive dosing pumps in multi-component dosing of fluid reaction components in a mixing chamber.

Application of the flowmeter in accordance with the invention within an electro-hydraulic amplifier in multi-component dosing of fluid reaction components not only avoids the system-inherent disadvantages of the linear amplifier, which is also used for dosing purposes, but also entails additional functional advantages for this field of application:

As a result of the substantially smaller moving masses of the rotating stroke piston motor in comparison with the linear hydraulic motor, the control rate of the above proposed embodiment is correspondingly larger than that of the electro-hydraulic linear amplifier. Furthermore, the embodiment in accordance with the invention has clear advantages in the case of bellows and other membrane dosing pumps which do not require a constant feed rate of the displacement element, but rather a constant volumetric flow. Since, unlike the linear amplifier, the electro-hydraulic amplifier with the flowmeter in accordance with the invention does not require a return piston stroke, it is possible to dose continuously. A further advantage consists in the fact that with single stroke dosing pumps a greater return stroke rate can be achieved, because the return stroke of the single stroke dosing pumps can be replaced by a more rapid drive. The linear amplifier, on the other hand, can only perform equal piston rates in both directions, whereby the permissible piston rate is limited by the thread pitch of a second spindle nut connection which converts the rotating movement of the measuring shaft into a translatory movement of the linear motor. If a fine thread is selected which allows a high degree of positioning accuracy, the piston rate is correspondingly low, if a larger thread is selected to allow greater piston rates, the accuracy of positioning is limited. The rotating stroke piston motor does not require this kind of spindle nut connection because it copies the rotary pre-specified movement of the control motor in the form of a likewise rotary output movement of the stroke piston motor. Consequently, it can always, even with the greatest piston rates, be set to high degrees of positioning accuracy.

In the following part of the description, a practical embodiment of the flowmeter in accordance with the invention as well as a practical embodiment and a practical application of an electro-hydraulic amplifier with the flowmeter in accordance with the invention are illustrated with the aid of drawings and are described in further detail.

Figure 1:
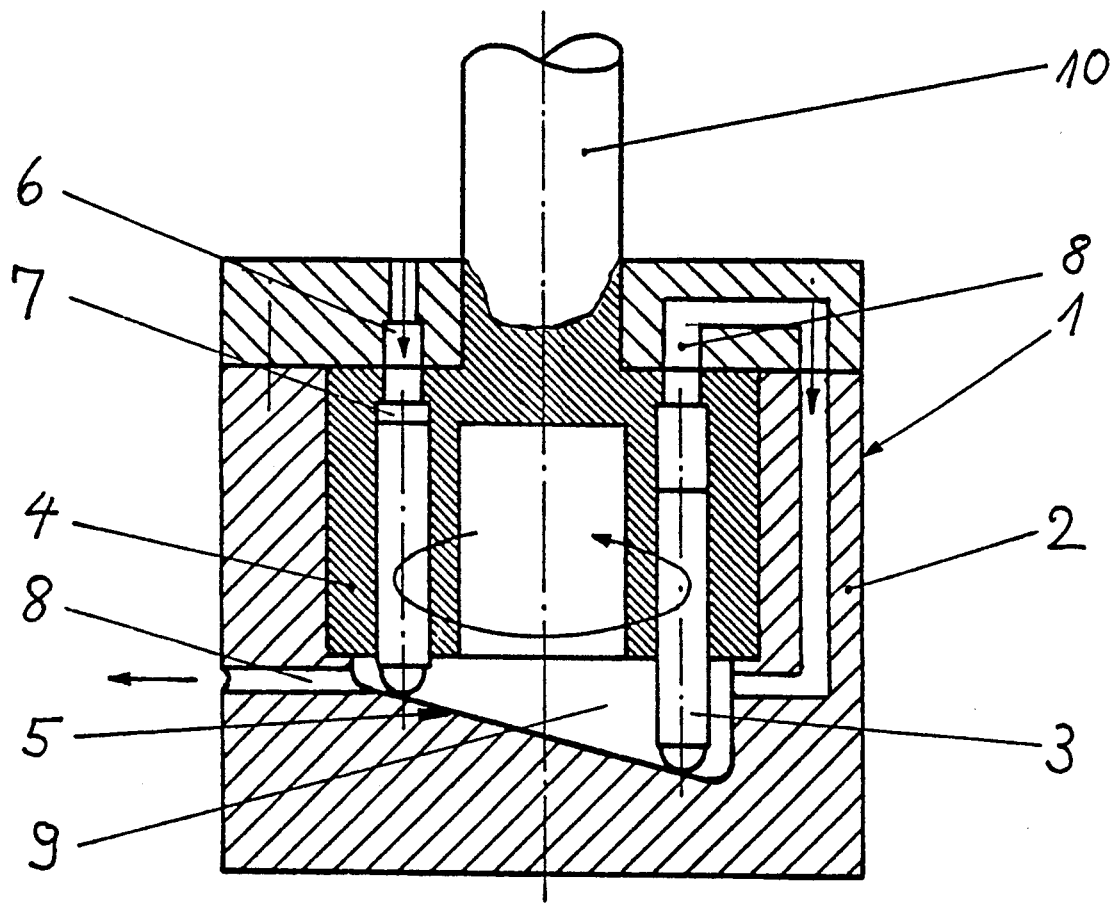
FIG. 1 shows a practical embodiment of the flowmeter in accordance with the invention.

FIG. 1 shows a practical embodiment of the flowmeter in accordance with the invention with an axial piston motor 1 located in a pressure-resistant casing 2. In order to achieve a volumetric flow as free from pulsations as possible, at least nine pistons 3 are necessary which run in a cylinder drum 4. The pistons 3 are supported on a slanting surface 5 installed in the casing 2. The forces of all cylinder chambers 7 connected to an inlet 6 which act vertically to the axis of the pistons 3 produce a torque on the cylinder drum 4, which is always only equal to the loss torque caused by the hydro-mechanical losses. The power loss resulting from the torque loss is converted to heat in the hydraulic motor 1. Consequently, provision must be made for efficient removal of the heat with the pressure fluid. This is achieved by the fact that the outlet 8 of the hydraulic motor 1 is conducted through the drive unit chamber 9 to the outside. A measuring shaft 10 connected to the cylinder drum 4 leads to the outside in this practical embodiment and is sealed against the casing 2 with a slide ring seal (not illustrated).

Figure 2:
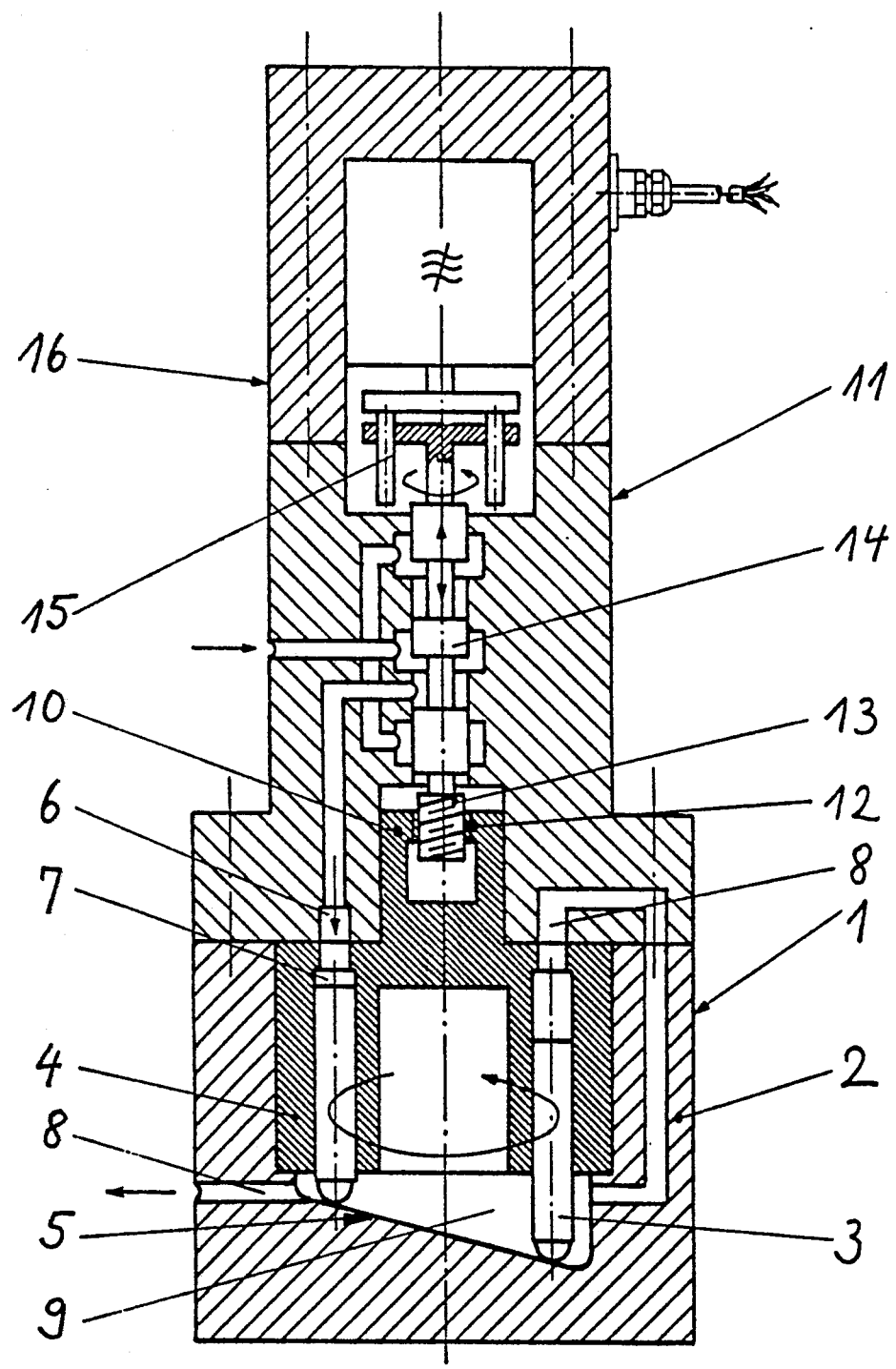
FIG. 2 shows a practical embodiment of the flowmeter in accordance with the invention inside an electro-hydraulic amplifier.

FIG. 2 shows a practical embodiment in accordance with the invention as a component part of an electro-hydraulic amplifier. The flowmeter shown in FIG. 1 is here connected in a sealed manner with a copying control valve 11, whereby the measuring shaft 10 is designed as a spindle nut 12 which acts in conjunction with the spindle 13. The spindle 13 is firmly connected with the control gate valve 14 of the copying control valve 1 as well as with a control motor 16 via an axial compensating coupling 15. If the control motor 16 produces a pre-specified rate of rotation corresponding to a certain volumetric flow, the spindle 13 is screwed out of the spindle nut 12 when the control motor 16 starts up, causing an axial displacement of the control gate valve 14, which thereupon opens the inlet 6 to the hydraulic motor 1. The volumetric flow thus released drives the hydraulic motor for as long as is necessary until the rate of rotation of the hydraulic motor 1 matches the rate of rotation of the control motor 16. If the rate of rotation of the hydraulic motor 1 exceeds the pre-specified rate of rotation of the control motor 16, the control gate valve 14 of the copying control valve 11 is screwed back into the middle position and thus blocks the inlet 6 to the cylinder chambers 7 until the control motor 16 and the cylinder drum 4 again rotate at the same rate of rotation. The volumetric flow entering at inlet 6 can thus be exactly measured and controlled in magnitude by means of a pre-specified rate of rotation of the control motor 16, which corresponds to a defined volumetric flow.

Figure 3:
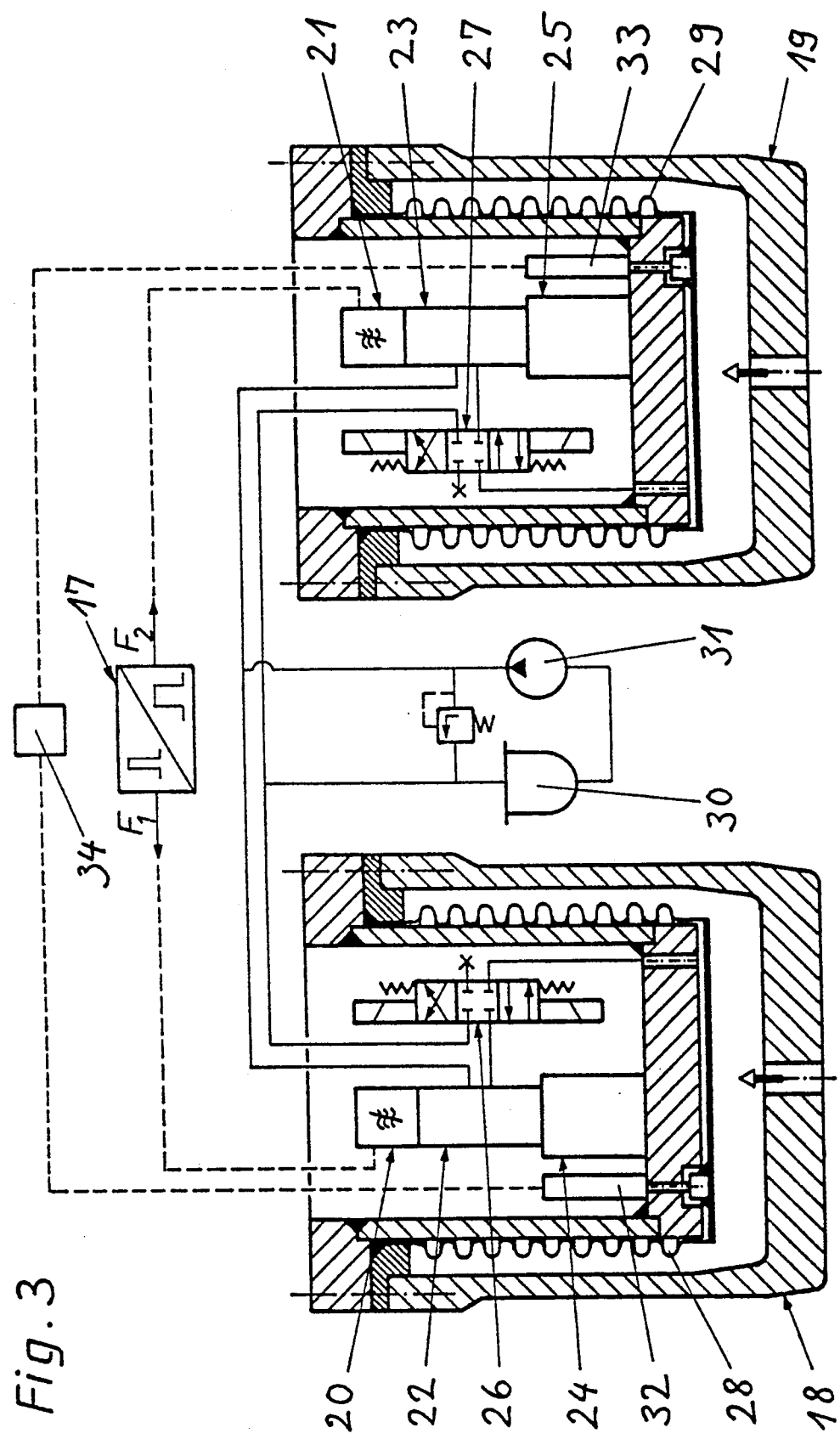
FIG. 3 shows a practical application of the flowmeter in accordance with the invention inside an electro-hydraulic amplifier in the two-component-dosing field of application.

FIG. 3 shows a practical application of the flowmeter in accordance with the invention in an electro-hydraulic amplifier in the two-component dosing field of application, whereby the electro-hydraulic amplifier serves the purpose of measuring and regulating a pre-specifiable volumetric flow for the hydraulic individual drive for bellows-type dosing pumps for the two-component dosing of fluid reaction components in a mixing chamber. As this type of bellows dosing pump allows very large stroke volumes (50 liters and above) with small frame size and complete freedom from leakages, the electro-hydraulic amplifier with the flowmeter in accordance with the invention is in this case particularly appropriate for the exact measurement and regulation of the volumetric flow. The volume throughput of the volumetric flow (=dosing amount of the reaction component) can be digitally pre-set before the dosing stroke with a very high degree of precision by means of a pulse counter device (not illustrated) integrated in the control frequency generator 17. The required volumetric dose ratio of the two reaction components located in the dosing cylinders 18, 19 respectively is digitally determined in the control frequency generator 17 by two pre-specified control frequencies F1 and F2. These two frequencies are allocated via amplifiers (not illustrated) to two stepping motors 20, 21 which convert each of them via two copying control valves 22, 23 and two axial piston motors 24, 25 in accordance with the invention without slip into an individually measured and controlled volumetric flow. The two electro-hydraulic amplifiers, consisting of the axial piston motors 24, 25 in accordance with the invention, the copying control valves 22, 23 and the stepping motors 20, 21 operate without control oscillations and are largely independent of counterpressure in their field of operations. After the dosing stroke is completed, the two stepping motors 20, 21 and the axial piston motors 24, 25 connected to them are stopped. Simultaneously, two 4/3 way valves 26, 27 switch via their zero setting to their return stroke setting. At this, the reaction components which are under inlet pressure and which are respectively located in the two dosing cylinders 18, 19 underneath the respective bellows 28, 29 force the bellows 28, 29 back to their starting position, whereby the hydraulic fluid, which is above the bellows 28, 29, flows back into a tank 30 belonging to a hydraulic aggregate 31 via the two 4/3 way valves 26, 27. In order to prevent the bellows 28, 29 from running out over their permissible stroke length, a stroke-end shutoff is necessary, which can be provided e.g. with two displacement pickups 32, 33. In addition, the two displacement pickups 32, 33 fulfill the task of additional monitoring of the dosing system. An evaluating electronic device 34 constantly compares the values provided by the two displacement pickups 32, 33 with the pre-selected number of pulses from the control frequency generator 17 and switches the device off when a defined differential value is exceeded because of the presence of a technical fault.

I claim:

1. A delivery system for controlling the flow of a fluid, said delivery system comprising:
   a hydraulic motor having:
      an inlet,
      an outlet,
      a shaft,
      piston means operable, when hydraulic fluid under pressure is introduced into the inlet, to cause rotation of said shaft at a rate which reflects the actual rate at which fluid is flowing through the system and out of said outlet, and
      chamber means for receiving fluid after it has caused rotation of said shaft and before it is discharged from the motor, wherein, during operation of said hydraulic motor, said outlet and said chamber means are in constant communication, and
   valve means for controlling the actual rate of flow of a fluid through the system, said valve means including
      an inlet for fluid,
      an outlet which is connected to said hydraulic motor inlet,
      a valve interposed between said inlet and said outlet for controlling the actual rate of fluid flow through the system,
   an electric motor having a shaft and associated electric motor control means for causing the electric control motor to rotate at a rate which reflects a desired rate of fluid flow through the system, and dynamic coupling means for connecting said hydraulic motor rotatable shaft, said electric motor rotatable shaft and said valve means so that, when there is a difference between the desired rate of fluid flow through the system and the actual rate of fluid flow through the system, the valve means are modulated to eliminate the difference.

2. A delivery system for controlling the flow of a fluid, said delivery system comprising a fluid inlet, a hydraulic motor of the stroke displacement type, said hydraulic motor having a rotatable shaft wherein the rate at which the hydraulic motor shaft is rotated reflects the rate of flow of a fluid through the system, said hydraulic motor having a drive unit chamber which has an outlet, said drive unit chamber being constantly connected to discharge fluid from its outlet, characterized in that said delivery system further comprises valve means for controlling the rate of flow of a fluid through the system, an electric control motor having a rotatable shaft which can be rotated at a controlled rate which reflects a desired rate of flow of fluid through the system, and dynamic coupling means for connecting said hydraulic motor rotatable shaft, said electric motor rotatable shaft and said valve means so that, when there is a difference between the desired rate of fluid flow through the system and the actual rate of fluid flow through the system, the valve means are modulated to eliminate the difference.

3. A delivery system in accordance with claim 2, characterized in that said hydraulic motor comprises a plurality of pistons carried in cylinder chambers, said delivery system being further characterized in that fluid that is discharged from the hydraulic motor cylinder chambers is discharged into the drive unit chamber.

4. A delivery system in accordance with claim 2, characterized in that the hydraulic motor is an axial piston motor.

5. In combination with apparatus comprising a mixing chamber and a dosing pump operably connected with said mixing chamber and operable, in response to the delivery thereto of a charge of a fluid, to deliver to said mixing chamber a component to be mixed in said chamber in an amount which varies as a function of the volume of the fluid charge, a delivery system as claimed in claim 2 operably connected to said dosing pump, and operable to deliver a fluid charge to said dosing pump.

6. A delivery system in accordance with claim 2, characterized in that fluid discharged from the hydraulic motor cylinder chambers is discharged into the drive unit chamber, and the hydraulic motor is an axial piston motor.

7. A delivery system in accordance with claim 6, characterized in that the valve means and the control motor each have a casing and these casings are connected with one another in a sealed manner.

8. A delivery system in accordance with claim 2, characterized in that the hydraulic motor and the valve means each have a casing, that within the casing of the valve means there is defined a leakage oil chamber, and in that these casings are connected with one another in a sealed manner, said delivery system being further characterized in that the drive unit chamber of the hydraulic motor is connected with the leakage oil chamber of the valve means for the purpose of reducing leakage.

9. A delivery system in accordance with claim 8, characterized in that the control motor has a casing which is connected with the casing of the valve means in a sealed manner and that, within the control motor casing, there is defined an inner chamber.

10. A delivery system in accordance with claim 9, characterized in that the inner chamber of the control motor is connected with the drive unit chamber of the hydraulic motor.

* * * * *

UNITED STATES PATENT AND TRADEMARK OFFICE
CERTIFICATE OF CORRECTION

PATENT NO. : 5,065,903
DATED : November 19, 1991
INVENTOR(S) : Hans W. Meinz

It is certified that error appears in the above-indentified patent and that said Letters Patent is hereby corrected as shown below:

On the Title page, item [57], Abstract, col. 2, line 2 should read --disclosed. The system comprises a control valve comprising an--.
Under Abstract, line 16, should read-- with a desired rate of fluid flow. The control motor shaft, the--. Line 18, should read--cally connected so that, when the rate at which fluid is--.

Signed and Sealed this

Nineteenth Day of October, 1993

Attest:

BRUCE LEHMAN

*Attesting Officer*   Commissioner of Patents and Trademarks